(12) United States Patent
Kim et al.

(10) Patent No.: US 9,445,098 B2
(45) Date of Patent: *Sep. 13, 2016

(54) APPARATUS AND METHOD FOR IMAGE ENCODING/DECODING USING PREDICTABILITY OF INTRA-PREDICTION MODE

(71) Applicant: SK TELECOM CO., LTD., Seoul (KR)

(72) Inventors: Hayoon Kim, Seongnam-si (KR); Byeungwoo Jeon, Seongnam-si (KR); Joohee Moon, Seoul (KR); Yunglyul Lee, Seoul (KR); Haekwang Kim, Seoul (KR); Jungyoup Yang, Seoul (KR); Kwanghyun Won, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 33 days.

This patent is subject to a terminal disclaimer.

(21) Appl. No.: 14/197,776

(22) Filed: Mar. 5, 2014

(65) Prior Publication Data

US 2014/0185675 A1 Jul. 3, 2014

Related U.S. Application Data

(63) Continuation of application No. 13/062,840, filed as application No. PCT/KR2009/005227 on Sep. 15, 2009, now Pat. No. 8,711,935.

(30) Foreign Application Priority Data

Sep. 22, 2008 (KR) .................. 10-2008-0092654

(51) Int. Cl.
*H04N 7/12* (2006.01)
*H04N 19/11* (2014.01)
(Continued)

(52) U.S. Cl.
CPC ............ *H04N 19/11* (2014.11); *H04N 19/147* (2014.11); *H04N 19/16* (2014.11); *H04N 19/176* (2014.11);
(Continued)

(58) Field of Classification Search
CPC ..................... H04N 19/00533; H04N 19/147; H04N 19/44; H04N 19/593; H04N 19/196; H04N 19/176; H04N 19/46; H04N 19/61; H04N 19/11
See application file for complete search history.

(56) References Cited

U.S. PATENT DOCUMENTS

2003/0223645 A1* 12/2003 Sun et al. ...................... 382/239
2005/0265447 A1 12/2005 Park
(Continued)

FOREIGN PATENT DOCUMENTS

| KR | 1020050046929 A | 5/2005 |
| KR | 1020070062146 A | 6/2007 |
| KR | 1020080034131 A | 4/2008 |

OTHER PUBLICATIONS

International Search Report mailed May 6, 2010 for PCT/KR2009/005227.

*Primary Examiner* — Sath V Perungavoor
*Assistant Examiner* — Xiaolan Xu
(74) *Attorney, Agent, or Firm* — Hauptman Ham, LLP

(57) ABSTRACT

An apparatus and a method for video encoding/decoding using predictability of an intra-prediction mode are disclosed. The apparatus for encoding a video of the present disclosure includes: an intra-prediction mode determiner for determining an encoder prediction mode which is an intra-prediction mode of a current block of the video; an encoder for encoding a residual block generated by subtracting, from the current block, a predicted block generated by predicting the current block according to the encoder prediction mode; a mode information generator for generating mode information according to whether or not a video decoding apparatus is able to predict the encoder prediction mode; and an encoded data generator for generating encoded data including the encoded residual block and the mode information. The present disclosure can enhance compression in video encoding/decoding by using intra-prediction to predict the video with a minimum necessary bit rate.

4 Claims, 17 Drawing Sheets

(51) Int. Cl.
      H04N 19/176      (2014.01)
      H04N 19/147      (2014.01)
      H04N 19/46       (2014.01)
      H04N 19/196      (2014.01)
      H04N 19/61       (2014.01)
      H04N 19/593      (2014.01)
      H04N 19/44       (2014.01)
      H04N 19/16       (2014.01)
(52) U.S. Cl.
      CPC ............ *H04N 19/196* (2014.11); *H04N 19/44*
      (2014.11); *H04N 19/46* (2014.11); *H04N 19/593* (2014.11); *H04N 19/61* (2014.11)

(56) References Cited

U.S. PATENT DOCUMENTS

| | | |
|---|---|---|
| 2006/0262216 A1 | 11/2006 | Shai et al. |
| 2007/0133891 A1 | 6/2007 | Jeong |
| 2009/0175334 A1* | 7/2009 | Ye .................. H04N 19/105 375/240.12 |
| 2009/0232215 A1 | 9/2009 | Park et al. |

* cited by examiner

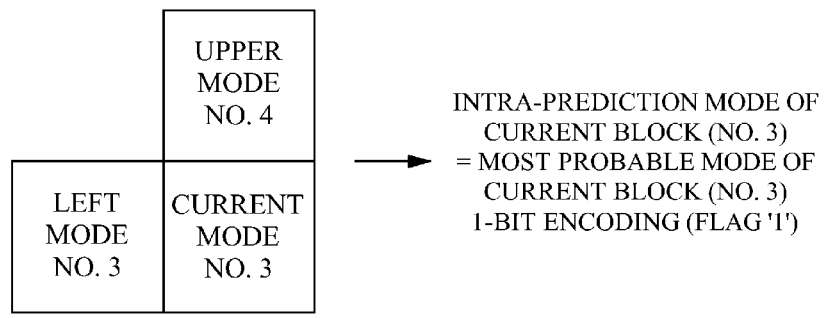
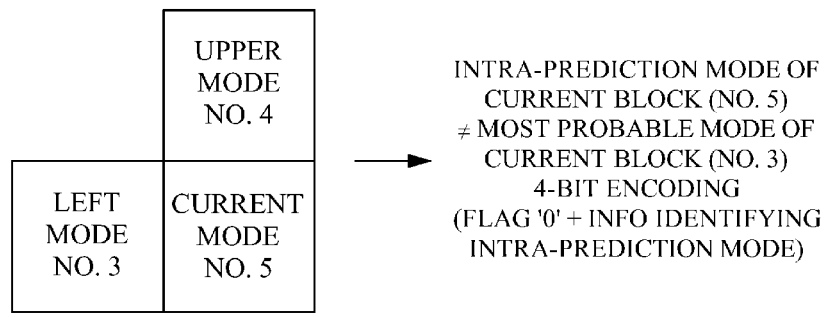
*FIG. 2*

$Cur_{pred}(ipmc, j) \oplus Cur_{residue}(j) = Cur_{pred}(ipmc, j) + Cur_{residue}(j)$ $Cur_{pred}(ipmc, j) + Cur_{residue}(j) \ominus Neigh(j) = g(ipmc) = \sum_{j \in BMAS} [Neigh(j) - \{Cur_{pred}(ipmc, j) + Cur_{residue}(j)\}]^2$

FIG. 15

| PREDICTION BY DECODER | CONDITION | | | MODE INFO | BIT RATE |
|---|---|---|---|---|---|
| PREDICTABLE | $ipm_{opt} = ipm_{dec(by\,enc)}$ | | 1ST ENCODING MODE IDENTIFIER ('1') | - | 1 BIT |
| | $ipm_{opt} \neq ipm_{dec(by\,enc)}$ & \|RECONSTRUCTED VIDEO DATA $ipm_{opt}$ −RECONSTRUCTED VIDEO DATA $ipm_{dec(by\,enc)}$\| $\leq$ THRESHOLD | | 1ST ENCODING MODE IDENTIFIER ('1') | - | 1 BIT |
| NON-PREDICTABLE | $ipm_{opt} \neq ipm_{dec(by\,enc)}$ & \|RECONSTRUCTED VIDEO DATA $ipm_{opt}$ −RECONSTRUCTED VIDEO DATA $ipm_{dec(by\,enc)}$\| $>$ THRESHOLD | REPRESENTATIVE MODE = $ipm_{opt}$ | 2ND ENCODING MODE IDENTIFIER ('0') | REP MODE APPLICATION IDENTIFIER ('1') | 2 BITS |
| | | REPRESENTATIVE MODE $\neq ipm_{opt}$ | 2ND ENCODING MODE IDENTIFIER ('0') | REP MODE NON-APPLICATION IDENTIFIER ('0') | 2+N BITS |
| | | | | PREDICTED MODE IDENTIFIER (N BITS) | |

FIG. 16

| CONDITION | MODE INFO | BIT RATE |
|---|---|---|
| $ipm_{opt}$ = REP MODE | A ENCODING MODE IDENTIFIER ('1') | 1 BIT |
| $ipm_{opt}$ = REP MODE & $ipm_{opt} = ipm_{dec(by\ enc)}$ | B ENCODING MODE IDENTIFIER ('01') | 2 BITS |
| $ipm_{opt}$ = REP MODE & $ipm_{opt} = ipm_{dec(by\ enc)}$ | C ENCODING MODE IDENTIFIER ('00'+'CODEWORD') | 2+N BITS |

*FIG. 17*

APPARATUS AND METHOD FOR IMAGE ENCODING/DECODING USING PREDICTABILITY OF INTRA-PREDICTION MODE

CROSS REFERENCE TO RELATED APPLICATION

This present application is a continuation of U.S. patent application Ser. No. 13/062,840, filed on Mar. 8, 2011, which is the National Phase application of International Application No. PCT/KR2009/005227, filed on Sep. 15, 2009, which designates the United States and was published in Korean. Further, this application claims the priority of Korean Patent Application No. 10-2008-0092654, filed on Sep. 22, 2008 in the KIPO (Korean Intellectual Property Office).

TECHNICAL FIELD

The present disclosure relates to a video image encoding/decoding apparatus and method using a predictability of intra-prediction mode. More particularly, the present disclosure relates to a video image encoding/decoding apparatus and method using intra-prediction to predict the video with a minimum necessary bit rate to encode information on the intra-prediction mode in order to improve the video compression efficiency.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264. Such H.264/AVC (hereinafter referred to as 'H.264') uses a spatial predictive coding method, which is different from conventional video coding-related international standards such as MPEG-1, MPEG-2, MPEG-4 Part2 Visual and the like.

Conventional video coding methods use "intra prediction" for coefficients transformed in discrete cosine transform domain (or DCT transform domain) to seek higher encoding efficiency resulting in degradation of the subjective video quality at low band transmission bit rates. However, H.264 adopts a method of encoding based on a spatial intra prediction in a spatial domain rather than in a transform domain.

Encoders using an encoding method based on the conventional spatial intra predictions predict pixels of a current block to encode from pixels in the previous blocks that underwent encoding and then decoding into the reconstruction, encode just the differences of the predicted block pixel values from pixels values of the current block and, transmit the encoded difference information to a decoder. Then, the encoder is supposed to transmit parameters needed for prediction of the block pixels, i.e. information on the intra-prediction mode to the decoder, or both the encoder and decoder may be made to use just a predefined intra-prediction mode, so that the decoder makes the same predictions as the encoder.

Therefore, at every event of block encoding, the intra-prediction mode of the corresponding block should be encoded, when it requires to encode and transmit the intra-prediction mode information per block, the amount of bits generated from the encoding operation increases, which in turn increases the amount of data in encoding of videos and leads to the degradation of the overall video compression performance.

DISCLOSURE

Technical Problem

Therefore, the present disclosure has been made for minimizing the bit amount to encode the intra-prediction mode information where the intra-prediction is used for the video prediction in the encoding or decoding of the videos in order to improve the compression performance.

Technical Solution

One aspect of the present disclosure provides an apparatus for encoding a video including: an intra-prediction mode determiner for determining an encoder prediction mode which is an intra-prediction mode of a current block of the video; an encoder for encoding a residual block generated by subtracting, from the current block, a predicted block generated by predicting the current block according to the encoder prediction mode; a mode information generator for generating mode information according to whether or not a video decoding apparatus is able to predict the encoder prediction mode; and an encoded data generator for generating encoded data including the encoded residual block and the mode information.

Another aspect of the present disclosure provides a method for encoding a video including: determining an encoder prediction mode which is an intra-prediction mode of a current block of the video; encoding a residual block generated by subtracting, from the current block, a predicted block generated by predicting the current block according to the encoder prediction mode; determining a decoder prediction mode or an intra-prediction mode to be predicted by a video decoding apparatus; if the encoder prediction mode is equal to the decoder prediction mode, generating a first encoding mode identifier as mode information, the first encoding mode identifier representing the equality of the encoder prediction mode to the decoder prediction mode; and generating encoded data including the encoded residual block and the mode information.

Yet another aspect of the present disclosure provides an apparatus for decoding a video including: a mode information extractor for extracting mode information from encoded data; a prediction mode determiner for determining an intra-prediction mode of a current block of the video if the mode information includes a first encoding mode identifier for representing an equality of an encoder prediction mode to a decoder prediction mode; a prediction mode extractor for determining, if the mode information includes a second encoding mode identifier for representing an inequality of the encoder prediction mode to the decoder prediction mode and information identifying the prediction mode for identifying the encoder prediction mode, an intra-prediction mode identified by information identifying prediction mode as the intra-prediction mode of the current block; and a decoder for decoding an encoded residual block extracted from the encoded data and adding the decoded residual block to a predicted block generated by predicting the current block according to the intra-prediction mode of the current block determined by the prediction mode determiner or the prediction mode extractor to reconstruct the current block.

Yet another aspect of the present disclosure provides a method for decoding a video including: extracting mode information from encoded data; determining an intra-prediction mode of a current block of the video if the mode information includes a first encoding mode identifier for representing an equality of an encoder prediction mode to a decoder prediction mode; if the mode information includes a second encoding mode identifier for representing an inequality of the encoder prediction mode to the decoder prediction mode and information identifying prediction mode for identifying the encoder prediction mode, performing a prediction mode extraction for determining an intra-prediction mode identified by information identifying the prediction mode as the intra-prediction mode of the current block; and decoding an encoded residual block extracted from the encoded data and adding the decoded residual block to a predicted block generated by predicting the current block according to the determined intra-prediction mode of the current block to reconstruct the current block.

Yet another embodiment of the present disclosure provides a method for decoding a video using intra-prediction including: extracting, from encoded data, mode information for representing whether or not a video decoding apparatus is able to predict an intra-prediction mode of a current block; determining the intra-prediction mode of the current block according to the mode information; generating a predicted block of the current block according to the determined intra-prediction mode; and decoding an encoded residual block of the current block, the residual block being extracted from the encoded data to reconstruct the residual block, and adding the reconstructed residual block to the predicted block to reconstruct the current block.

Advantageous Effects

According to the disclosure as described above, in encoding and decoding a video involving intra-prediction to predict the video, it only needs a minimum bit rate to encode information on the intra-prediction mode to enhance the video compression performance.

Further areas of applicability will become apparent from the description provided herein. It should be understood that the description and specific examples are intended for purposes of illustration only and are not intended to limit the scope of the present disclosure.

DESCRIPTION OF DRAWINGS

The drawings described herein are for illustration purposes only and are not intended to limit the scope of the present disclosure in any way.

FIG. 2 is an exemplary diagram showing a process of encoding the intra-prediction modes according to H.264/AVC standard;

FIG. 15 is an exemplary diagram showing a process of calculating a decision function according to an aspect; and FIGS. 16 and 17 are exemplary diagrams showing mode information generated according to as aspect.

MODE FOR INVENTION

Figure 1:
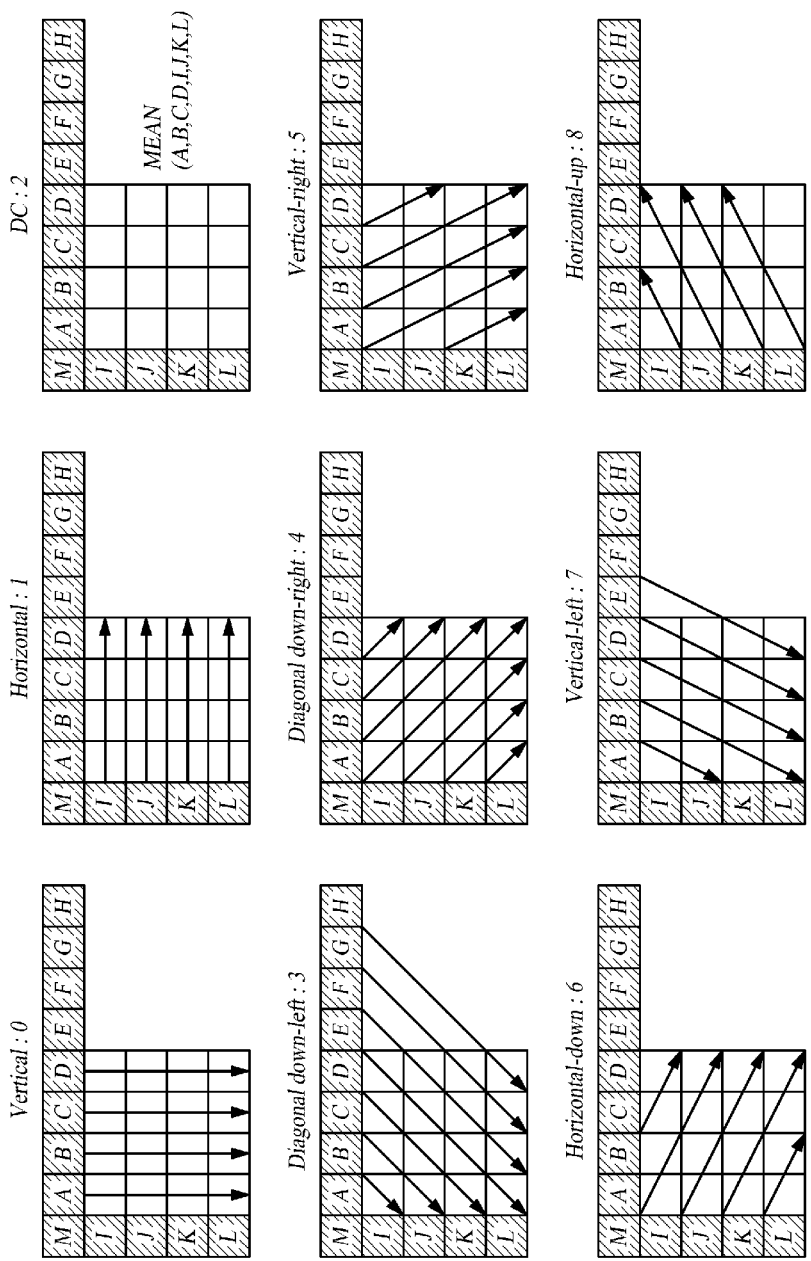
FIG. 1 is an exemplary diagram of nine intra-prediction modes for the conventional intra_4×4 prediction according to H.264/AVC standard.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is an exemplary diagram of nine intra-prediction modes for the conventional intra_4×4 prediction according to H.264/AVC standard.

There are nine prediction modes to form the intra_4×4 prediction including a vertical mode, horizontal mode, direct current (DC) mode, diagonal down-left mode, diagonal down-right mode, vertical-right mode, horizontal-down mode, vertical-left mode and horizontal-up mode. The intra_8×8 prediction also has four modes similar to the intra_4×4 prediction. The intra_16×16 prediction uses four prediction modes which include a vertical mode, horizontal mode, DC mode and plane mode.

The blocks to be encoded such as sub-blocks or macroblocks are predicted in accordance with intra-prediction modes, and in particular a video encoding apparatus selects among the above described multiple prediction modes the optimal one for the block to be currently encoded or current block and then forms the prediction according to the selected optimal mode. Here, the optimal prediction mode may be the prediction mode determined as having the lowest encoding cost among various intra-prediction modes for performing the intra-prediction (i.e., respectively nine modes in the intra_8×8 prediction and the intra_4×4 prediction and four modes in the intra_16×16 prediction).

In order for a video decoder to identify the prediction modes of the respective current blocks and to form the same predictions as the video encoder, the prediction mode of each current block should be transmitted from the video encoder to the decoder requiring about four bits of data for transmitting information on the respective current block prediction mode.

FIG. 2 is an exemplary diagram showing a process of encoding the intra-prediction modes according to H.264/AVC standard.

In H.264/AVC, when encoding the current block prediction mode, an estimated value of the intra-prediction mode of the current block is calculated from the prediction modes of neighboring blocks (mostly the upper or left side blocks of the current block) and is used in encoding the intra-prediction mode of the current block. Here, the estimated value of the intra-prediction mode may be called most probable mode (MPM).

The most probable mode of the current block is determined as the intra-prediction mode having the smallest among the mode numbers for identifying the left and upper blocks of the current block. For example in FIG. 2, between the mode numbered 3 for the left block and mode numbered 4 for the upper block as shown at 2A, the smaller mode 3 of intra-prediction mode becomes the most probable mode of the current block. Therefore, the most probable mode has 3 as its mode number.

When encoding the intra-prediction mode of the current block, the video decoding apparatus compares the most probable mode of the current block with the predetermined intra-prediction mode of the current block to determine if they are identical and then accordingly encode the intra-prediction mode in different methods. Specifically, if the intra-prediction mode of the current block and the most probable mode are identical, the video encoding apparatus encodes a 1-bit flag (for example, '1') for indicating the equality of the two modes. To the contrary, if the intra-prediction mode of the current block and the most probable mode are not identical, the video encoding apparatus encodes a 1-bit flag (for example, '0') for indicating the inequality of the two modes and encodes additional information for identifying the one of the other modes among candidate intra-prediction modes than the most probable mode, spending extra 3 bits in the process.

If predictions are formed with respect to the intra-prediction mode in this way, where the current block has an intra-prediction mode identical to the most probable mode, the compression performance may be considered improved because only 1-bit flag is to be encoded. However, when the two modes are not identical, total 4 bits (1 for the flag plus 3 for identifying the intra-prediction mode) are to be encoded, which deteriorates the compression performance.

Figure 3:
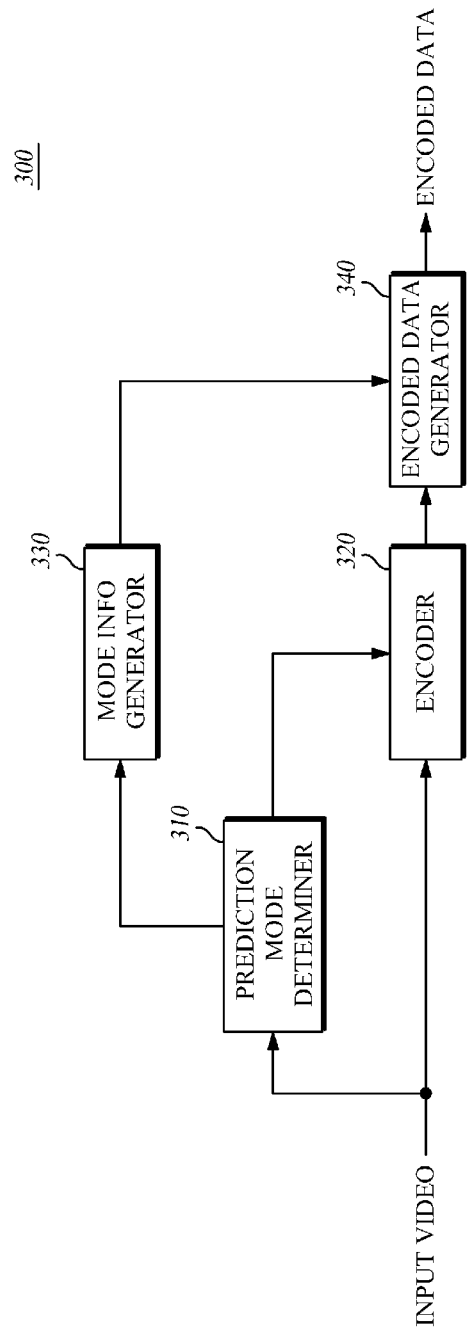
FIG. 3 is a schematic block diagram of a video encoding apparatus according to an aspect of the present disclosure.

FIG. 3 is a schematic block diagram of a video encoding apparatus 300 according to an aspect of the present disclosure.

Video encoding apparatus 300 may be comprised of a prediction mode determiner 310, encoder 320, a mode info generator 330, and an encoded data generator 340. Video encoding apparatus 300 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Prediction mode determiner 310 predicts an encoder prediction mode i.e., an intra-prediction mode of a current block of the video. To this end, prediction mode determiner 310 may select an intra-prediction mode among selectable candidate intra-prediction modes, which satisfies optimal selection criteria.

Specifically, to predict the current block to be encoded, prediction mode determiner 310 collates a candidate set (CS) consisting of one or more selectable candidate intra-prediction modes, and selects a single optimal satisfactory intra-prediction mode from the candidates in the set.

Here, the candidate set may be the nine intra-prediction modes for the intra_4×4 prediction recommended by the H.264/AVC standard, although it is not so limited and may be diversely defined provided that the definition is known to both the video encoding and the decoding apparatus. For example, in selecting the set of the candidates, they can be among a wide variety of intra-prediction modes depending on the method of implementation or requirement, or according to the desired applications or video sequences, and they can vary even by the respective blocks subjected to be encoded.

In addition, as for the optimal selection criteria, a rate-distortion cost (RD cost) can be used considering bit rates and distortions generated from predicting and encoding the current block for the respective candidate intra-prediction modes in the candidate set, although it is not so limited and any criterion may be used as far as they can offer an optimal encoding performance. Equation 1 is an exemplary equation for determining the intra-prediction modes by using the rate-distortion cost.

$$ipm_{opt} = \operatorname*{argmin}_{ipmc \in CS} f(ipmc) \qquad \text{Equation 1}$$

$$f(ipmc) = D(ipmc) + \lambda R(ipmc)$$

In Equation 1, ipmc represents a candidate intra-prediction modes in the candidate set, and $ipm_{opt}$ represents an encoder intra-prediction mode or a current block intra-prediction mode elected among the candidate intra-prediction modes as an optimal intra-prediction mode according to the described optimal selection criteria. f( ) is a function according to the optimal selection criteria, and it may be a rate-distortion optimization function to find the optimal intra-prediction mode on the basis of the rate-distortion cost. λ is a Lagrangian constant.

Encoder 320 encodes a residual block generated by subtracting a predicted block from the current block, wherein the predicted block is generated by predicting the current block according to encoder prediction mode $ipm_{opt}$. To be specific, encoder 320 predicts each of the pixels in the current block in a prediction direction of the encoder prediction mode determined by prediction mode determiner 310 to generate a predicted block, subtracts the predicted block from the current block to generate the residual block having a residual signal, and then performs a transform and quantization with respective to the residual block to encode the resulting quantized frequency-coefficients.

Here, the residual block is arranged to have the residual signal or a difference between pixel values by subtracting the predicted pixel values of the respective predicted block from the original pixel values of the respective current block. As for the method of transform, discrete cosine transform or DCT-based transform or Hadamard transform may be used, although there is no limitations on other improved or modified DCT transform techniques, which will transform the residual signal first into the frequency domain and then to the frequency-coefficients. For the quantization method, a dead zone uniform threshold quantization (DZUTQ) or a quantization weighted matrix may be used, although their improvements or other variants of quantization are acceptable as well. For the encoding technique, an entropy encoding would work, but it is not to limit employing other various encoding techniques.

Mode info generator 330 generates mode information according to whether a video decoding apparatus is able to predict the encoder prediction mode. In other words, mode info generator 330 is adapted to generate mode information to enable the video decoding apparatus to use the same intra-prediction mode as the video encoding apparatus 300 in predicting the current block followed by encoding the same, wherein the mode information is generated according to whether the video decoding apparatus itself can predict the encoder prediction mode.

To this end, mode info generator 330 may generate information on whether the video decoding apparatus is able to predict the encoder prediction mode as the mode information. For example, checking whether the video decoding apparatus can predict the encoder prediction mode, the mode info generator 330 may generate the flag '1' as the mode information when it determines the predictability, but the flag '0' as the mode information at an unpredictability of the video decoding apparatus. In this occasion, if the video decoding apparatus receives the mode information of flag '1', the apparatus itself is supposed to predict the current block intra-prediction mode using a predicted intra-prediction mode after forming a prediction on the intra-prediction mode of the current block, and upon receiving the mode information of flag '0', it may predict the current mode using a predetermined intra-prediction mode. Here, the predetermined intra-prediction mode may mean an intra-prediction mode that is predefined by the video encoding apparatus 300 and video decoding apparatus.

In addition, if mode info generator 330 determines that the video decoding apparatus can predict the encoder prediction mode, it may generate a first encoding mode identifier for representing such predictability as the mode information. Specifically, checking whether the video decoding apparatus can predict the encoder prediction mode, the mode info generator 330 may generate the first encoding mode identifier when it determines the predictability. Since the first encoding mode identifier may indicate the predictability of the encoder prediction mode by the video decoding apparatus, it can be implemented by 1-bit valued '1' or '0'. Therefore, in the event where the video decoding apparatus is able to predict the same intra-prediction mode as the one determined by the video encoding apparatus 300, only a single bit of information would have to be transmitted from the video encoding apparatus 300 to the video decoding apparatus, thereby minimizing the encoded data and thus improving the compression performance and consequently enhancing the overall compression efficiency.

In addition, if mode info generator 330 determines that the video decoding apparatus cannot predict the encoder prediction mode, it may generate a second encoding mode identifier for representing such unpredictability coupled with information identifying the prediction mode for identifying the encoder prediction mode as the mode information. Specifically, checking whether the video decoding apparatus can predict the encoder prediction mode, the mode info generator 330 may generate the second encoding mode identifier when it determines the unpredictability. As the first identifier indicates the predictability, since the second encoding mode identifier may indicate the unpredictability of the encoder prediction mode by the video decoding apparatus, it can be likewise implemented by 1-bit valued '1' or '0' and may become a different value than the first encoding mode identifier.

However in this case, if the second encoding mode identifier is to be the sole constituent of the mode information, the video decoding apparatus is not able to predict the encoder prediction mode and thus cannot determine the intra-prediction mode as a means for predicting the current block. Of course, as stated above, although it is possible to determine the preset intra-prediction mode as the current block intra-prediction mode, it would noticeably lower the prediction efficiency and thus the compression efficiency. Therefore, to enable the video decoding apparatus to identify the encoder prediction mode, information identifying the prediction mode may be generated along with the second encoding mode identifier. Here, information identifying the prediction mode may be an identifier for designating a particular intra-prediction mode selected to be the encoder prediction mode among the candidate intra-prediction modes in the candidate set. Such identifier may be expressed in bitstream, which is, for example, N-bit of '0011' or such (N being possibly an arbitrary integer) for identifying mode number 2 where the encoder prediction mode is a horizontal mode of intra_4×4 prediction.

Besides simply using the identifier as information identifying the prediction mode to directly designate encoder intra-prediction mode as above, mode info generator 330 may otherwise determine whether the video decoding apparatus is able to identify the encoder prediction mode to accordingly generate information identifying the prediction mode. That is, if the encoder prediction mode is equal to a representative mode of the current block, mode information generator 330 may generate as information identifying the prediction mode a representative mode application identifier for representing the equality of the encoder prediction mode to the representative mode of the current block, and if the encoder prediction mode is not equal to the representative mode of the current block, it may generate as information identifying the prediction mode a representative mode non-application identifier for representing the inequality of the encoder prediction mode to the representative mode coupled with the prediction mode identifier for identifying the encoder prediction mode.

Here, since the representative mode application identifier and the representative mode non-application identifier are to represent the equality and the inequality of the encoder prediction mode to the representative mode respectively, they can become implemented by 1-bit valued '1' or '0'. In addition, the representative mode may be the most probable mode or MPM. As explained referring to FIG. 2, the MPM of the current block may be determined as the intra-prediction mode having a smaller mode number among the mode numbers of the intra-prediction modes of the neighboring blocks (in particular, the left and upper blocks) of the current block. In addition, like the above described identifier, the prediction mode identifier may be an identifier for designating a particular intra-prediction mode selected to be the encoder prediction mode among the candidate intra-prediction modes in the candidate set, and it may be expressed in bitstream, which is, for example, an N-bit of '0011' or such for identifying mode number 2 where the encoder prediction mode is a horizontal mode of intra_4×4 prediction. The prediction mode identifier may designate one of the intra-prediction modes other than the representative mode as the candidate intra-prediction mode.

In addition, upon deciding the video decoding apparatus cannot predict the encoder prediction mode, the mode information generator 330 may generate the mode information according to whether or not the difference between reconstructed video data in accordance with the encoder prediction mode and reconstructed video data in accordance with a decoder prediction mode that is an intra-prediction mode of the current block to be predicted by the video decoding apparatus is equal to or less than a threshold. Specifically, upon deciding the unpredictability of the encoder prediction mode by the video decoding apparatus, mode info generator 330 uses the same method as the decoding apparatus does the prediction for determining the encoder prediction mode $ipm_{dec(by\_enc)}$, and then generates the reconstructed video data that is from predicting the current block in the encoder prediction mode prediction direction and encoding thereof and also the reconstructed video data that is from predicting the current block in the decoder prediction mode prediction direction and decoding the same, and eventually compares the respective reconstructed video data to check if the difference of the reconstructed video data by $ipm_{opt}$—the reconstructed video data by $ipm_{dec(by\_enc)}$ is equal to or less than a preset threshold.

Additionally, if the difference between the reconstructed video data in accordance with the encoder prediction mode and the reconstructed video data in accordance with the decoder prediction mode is equal to or less than the threshold, mode info generator 330 may generate as the mode information a first encoding mode identifier for representing the predictability of the encoder prediction mode by the video decoding apparatus. Specifically, even with the inequality between the encoder prediction mode and the decoder prediction mode, if the difference between the reconstructed video data in accordance with the encoder prediction mode and the reconstructed video data in accordance with the decoder prediction mode remains to be equal to or less than the threshold, since the video decoding apparatus using the decoder prediction mode to encode the current block and decode the same into a reconstructed video block sees little difference in the resulting video when compared to one from using the encoder prediction mode, barely affecting the video quality, the encoder prediction mode and the decoder prediction mode are deemed to be equal and the first encoding mode identifier is generated.

In addition, if the difference between the reconstructed video data in accordance with the encoder prediction mode and the reconstructed video data in accordance with the decoder prediction mode is greater than the threshold, mode info generator 330 may generate as the mode information a second encoding mode identifier for representing the unpredictability of the encoder prediction mode by the video decoding apparatus coupled with information identifying the prediction mode for identifying the encoder prediction mode. Specifically, if the threshold is exceeded by the difference between the reconstructed video data in accordance with the encoder prediction mode and the reconstructed video data in accordance with the decoder prediction mode, since the video decoding apparatus using the decoder prediction mode to encode the current block and decode the same into a reconstructed video block encounters a significant difference in the resulting video when compared to one from using the encoder prediction mode, correspondingly affecting the video quality, the unpredictability of the encoder prediction mode by the video decoding apparatus is announced and information identifying the prediction mode may be generated as the mode information to identify the encoder prediction mode. When mode info generator 330 generates information identifying the prediction mode, it may do so differently according to whether the current block representative mode and the encoder prediction mode are identical as described above.

Meanwhile, mode info generator 330 may decide if the video decoding apparatus is able to predict the encoder prediction mode by calculating a decision function of each of the candidate intra-prediction modes selectable by the video decoding apparatus, selecting an intra-prediction mode having a minimum value of the decision function from the selectable candidate intra-prediction modes, and confirming whether the selected intra-prediction mode is equal to the encoder prediction mode.

For example, in order to decide the predictability of the encoder prediction mode by the video decoding apparatus itself, mode info generator 330 may use Equation 2 for determining the decoder prediction mode $ipm_{dec(by\_enc)}$ or the intra-prediction mode of the current block to be predicted by the video encoding apparatus.

$$ipm_{dec(byenc)} = \underset{ipmc \subset CS'}{\arg\min} g(ipmc) \quad \text{Equation 2}$$

$$g(ipmc) = \sum_{j \in BMS} [Neigh(j) - \{Cur_{pred}(ipmc, j) + Cur_{residue}(j)\}]^2$$

In Equation 2, boundary matching set (BMS) refers to a set of indices for representing the positions of pixels in the current block at the boundary between neighboring blocks. $Cur_{pred}(ipmc, j)$ stands for the predicted pixels in the predicted block generated from predicting the current block in the respective candidate intra-prediction modes selectable by the video decoding apparatus, and $Cur_{residue}(j)$ indicates a residual block or the current block subtracted by the predicted block generated from predicting the current block in the encoder prediction mode after the residual block went through a transform, quantization, the subsequent inverse quantization, inverse transform, and finally its reconstruction. $Neigh(j)$ represents the previously reconstructed neighboring block pixels adjacent to the current block pixels indicated by index j.

To this end, mode info generator 330 calculates the decision function of g( ) in Equation 2 with respect to the candidate intra-prediction modes ipmc selectable among the candidate set CS' selectable by the video encoding apparatus for the current block, and selects from the candidate intra-prediction modes an intra-prediction mode having a minimum value of the decision function of g( ) as the encoder prediction mode $ipm_{dec(by\_enc)}$. The candidate set CS' selectable by the video encoding apparatus for the current block may be the same as the candidate set CS selectable by the video encoding apparatus 300, although they may be different according to the present disclosure.

Herein, the decision function of g( ) may be a function for calculating in a boundary matching algorithm (BMA) the difference between boundary pixels in the current block at the boundary against the neighboring blocks and the adjacent pixels in the immediately neighboring blocks. Although Equation 2 defines the decision function g( ) as the sum of squares of the differences between the boundary pixels and adjacent pixels, the decision function may not be constrained by such definition but defined in diverse ways on the condition that the definition is shared by the video encoding apparatus 300 and the decoding apparatus. For example, in defining the decision functions, an improved boundary matching algorithm may be employed, which performs its definition so that the locations of the pixels used in boundary matching differ by the directivities which the respective candidate intra-prediction modes have. In addition, to define the decision functions, it is possible to differently use the BMS for defining the pixels used in the boundary matching by the directivities of the respective candidate intra-prediction modes, and the sum of absolute values may be used rather than the sum of squares of the differences between the boundary pixels and adjacent pixels.

Therefore, mode info generator 330 first prepares a calculation of the reconstructed residual pixels $\text{Cur}_{residue}(j)$ located at the boundary among the residual blocks which were reconstructed through the prediction of the current block in the encoder prediction mode from encoding and decoding of the resultant residual block, predicts the current block according to an arbitrary intra-prediction mode among the candidate intra-prediction modes to obtain a predicted pixel in the predicted block at the boundary pixel location that is $\text{Cur}_{pred}(\text{ipmc}, j)$, adds a residual block $\text{Cur}_{residue}(j)$ thereto, subsequently subtracts an adjacent pixel Neigh(j) in the previously reconstructed neighboring block before raising the result, and carries out this calculation for all of the pixels at the boundary pixel locations to get their sum and the resultant g(ipmc). This process is repeated for each of the candidate intra-prediction modes and a determination is made on the intra-prediction mode having the lowest value, whereby the decoder prediction mode $\text{ipm}_{dec(by\ enc)}$ is determined.

In the present disclosure, mirror-like process of determining the intra-prediction mode of the above is also carried out in the video decoding apparatus. Therefore, video encoding apparatus 300 follows the same way the video decoding apparatus operates to have the current block intra-prediction mode determined, and checks if the predetermined current block intra-prediction mode, i.e. the encoder prediction mode $\text{ipm}_{opt}$ is equal to the current block intra-prediction mode to be predicted in the video decoding apparatus, i.e. the decoder prediction mode $\text{ipm}_{dec(by\ enc)}$ and if they are equal, video encoding apparatus 300 notifies the video decoding apparatus of the equality by supplying it with just the first encoding mode identifier encoded but if they are not, video encoding apparatus 300 also encodes information identifying the prediction mode and transmits it to the video decoding apparatus to let it identify the intra-prediction mode.

While it is described above as mode info generator 330 primarily determines whether the encoder prediction mode and the decoder prediction mode are identical and accordingly generates either the first encoding mode identifier or a third encoding mode identifier as the mode information, mode info generator 330 according to an aspect of the present disclosure may primarily determine whether the encoder prediction mode and the current block representative mode are identical and accordingly generate one of encoding mode identifiers A to C as the mode information.

Specifically, if the encoder prediction mode and the current block representative mode are identical, mode info generator 330 may generate the encoding mode identifier A for indicating this identity. If the encoder prediction mode is not identical to the current block representative mode but equal to the decoder prediction mode, mode info generator 330 may generate the encoding mode identifier B for indicating such difference and identity of the encoder prediction mode as the mode information. In addition, if the encoder prediction mode is identical neither to the current block representative mode nor to the decoder prediction mode, mode info generator 330 may generate encoding mode identifier C for indicating such difference of the encoder prediction mode as the mode information.

Encoded data generator 340 generates encoded data that includes the encoded residual block and the mode information. Specifically, encoded data generator 340 generates the encoded data that includes a bit string of the residual block encoded by encoder 320 and a bit string of the mode information generated by mode info generator 330. In the present disclosure, the encoded data means data generated from encoding by video encoding apparatus 300 with respect to input data for input video or input data for block divisions made of the input video broken into predetermined block units. The encoded data may be compressed data of the input data through a compression in the course of the encoding, but may be uncompressed data even after the encoding. In addition, the encoded data may be generated in a bit string having a certain sequence such as a bitstream although it is not necessarily so limited but could be generated in packets, and it can be transmitted in a serial order or in parallel without a specific sequence depending on its format.

FIGS. 4 to 11 are flow diagrams for illustrating a video encoding method according to an aspect of the present disclosure.

Figure 4:
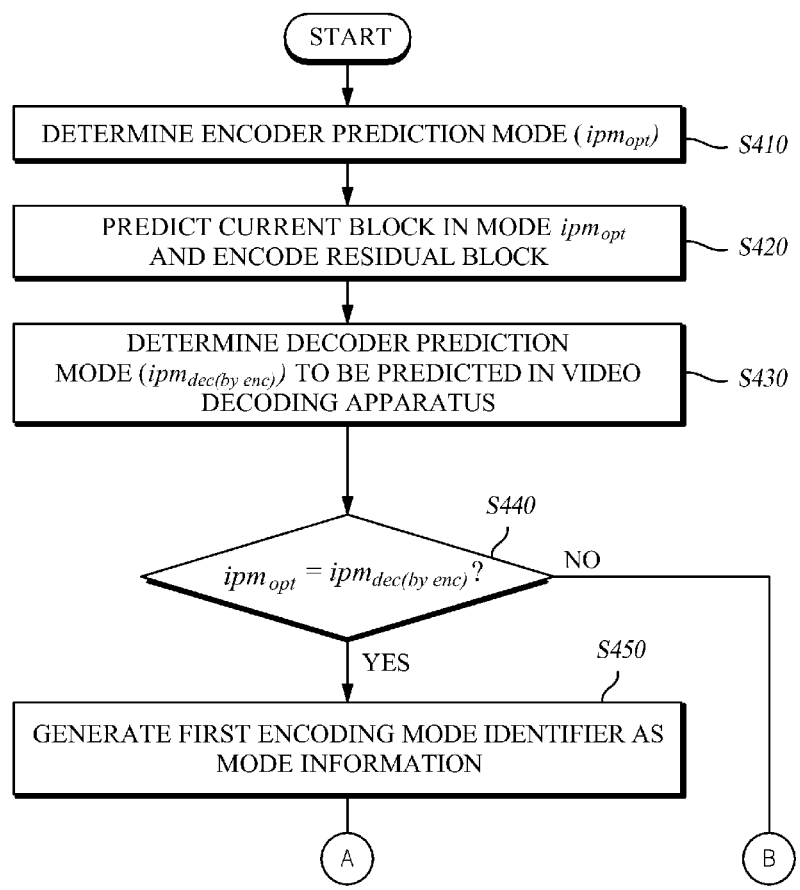
FIGS. 4 to 11 are flow diagrams for illustrating a video encoding method according to an aspect.
Figure 5:
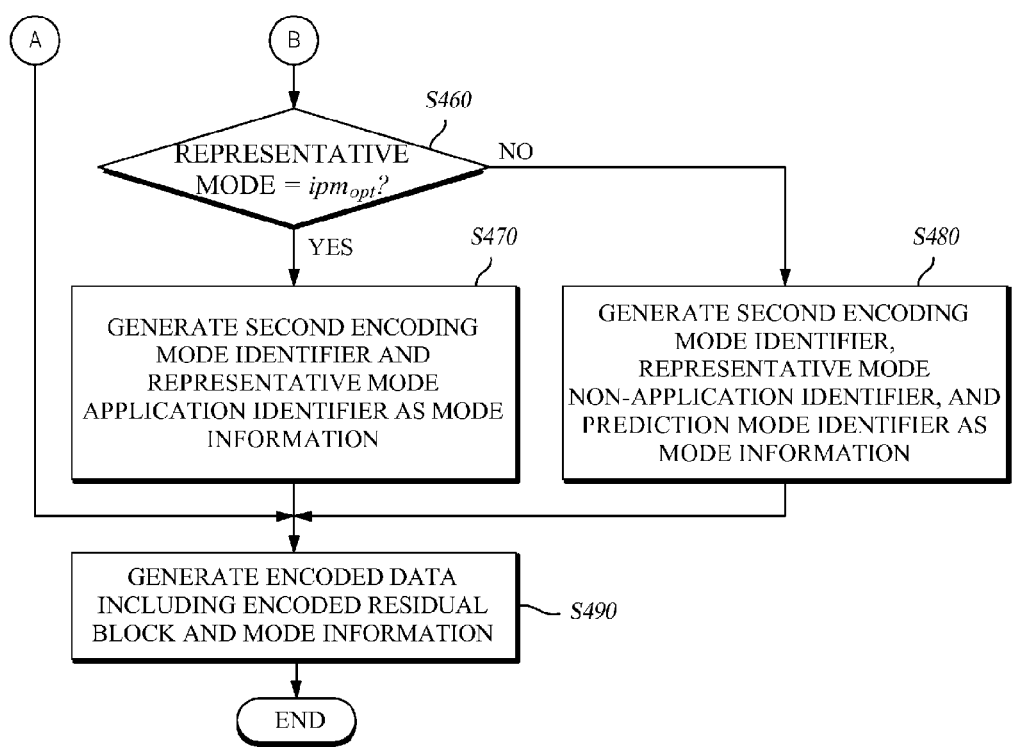

Referring to FIGS. 4 and 5, upon determining the current block to be encoded in the video, video decoding apparatus 300 selects intra-prediction modes selectable for the current block and determines an encoder prediction mode or the current block intra-prediction mode by means of a single intra-prediction mode selected from the intra-prediction modes on the basis of an optimal selection criteria at step S410. In the determined encoder prediction mode, video decoding apparatus 300 predicts the current block to generate a predicted block and encodes a residual block generated by subtracting the predicted block from the current block at step S420.

While mode info generator 330 at step S420 may perform generating the predicted mode for use in generating the residual block to encode, it could perform such encoding at step S410 through using one or both of the predicted block and residual block generated in the course of determining the encoder prediction mode. In other words, at step S410, mode info generator 330, following the optimal selection criteria in the course of determining the encoder prediction mode, might have already generated the residual block through the prediction of the current block in the determined encoder prediction mode for the generation of the predicted block and the subtraction of the predicted block from the current block. For example, in case the optimal selection criteria is rate-distortion optimization (RDO), the choice of an encoder prediction mode is such that predictions on the current block are performed in the respective collated intra-prediction modes for using the predicted block to generate the residual block, encode the same, and then determine the intra-prediction mode involving the lowest cost to encode as the encoder prediction mode. Therefore, in this instance, since the predicted block and residual block have been already generated for the corresponding intra-prediction mode, the residual block encoding by video encoding apparatus 300 at step S420 may be achieved through using the prepared predicted block or encoding the prepared residual block.

In addition, video encoding apparatus 300 determines a decoder prediction mode $\text{ipm}_{dec(by\ enc)}$ or an intra-prediction mode to be predicted in the video decoding apparatus at step S430, and compares an encoder prediction mode $\text{ipm}_{opt}$ and the decoder prediction mode $\text{ipm}_{dec(by\ enc)}$ to check whether they are identical at step S440. Meanwhile, although FIG. 4 illustrates that step S420 is followed by step S430, they may be in a reverse order. Besides, for the purpose of description, an aspect of the disclosed method is expressed stepwise, but the present invention is not necessarily limited to these multiple steps.

Upon confirming at step S440 that the encoder prediction mode and decoder prediction mode are identical as $\text{ipm}_{opt}=\text{ipm}_{dec(by\ enc)}$, video encoding apparatus 300 generates a first encoding mode identifier for representing the identity of the encoder and decoder prediction modes as the mode information at step S450. Here, the first encoding mode identifier may be implemented by a 1-bit flag like "1".

On the contrary, upon confirming at step S440 that the encoder prediction mode and decoder prediction mode are not identical as $ipm_{opt} \neq ipm_{dec(by\ enc)}$, video encoding apparatus 300 checks whether the current block representative mode and encoder prediction mode are identical at step S460. If they are identical, video encoding apparatus 300 generates both of a second encoding mode identifier for representing the inequality of the encoder prediction mode to the decoder prediction mode and a representative mode application identifier for representing the equality of the representative mode to the encoder prediction mode as the mode information at step S470, and unless the representative mode and encoder prediction mode are identical either, it generates as the mode information all of the second encoding mode identifier for representing the inequality of the encoder prediction mode to the decoder prediction mode, a representative mode non-application identifier for representing an inequality of the representative mode to the encoder prediction mode, and a prediction mode identifier for identifying the encoder prediction mode at step S480.

At step S490, video encoding apparatus 300 generates and outputs encoded data including the residual block encoded at steps S420 and the mode information generated in one of steps S450, S470, and S480.

Figure 6:
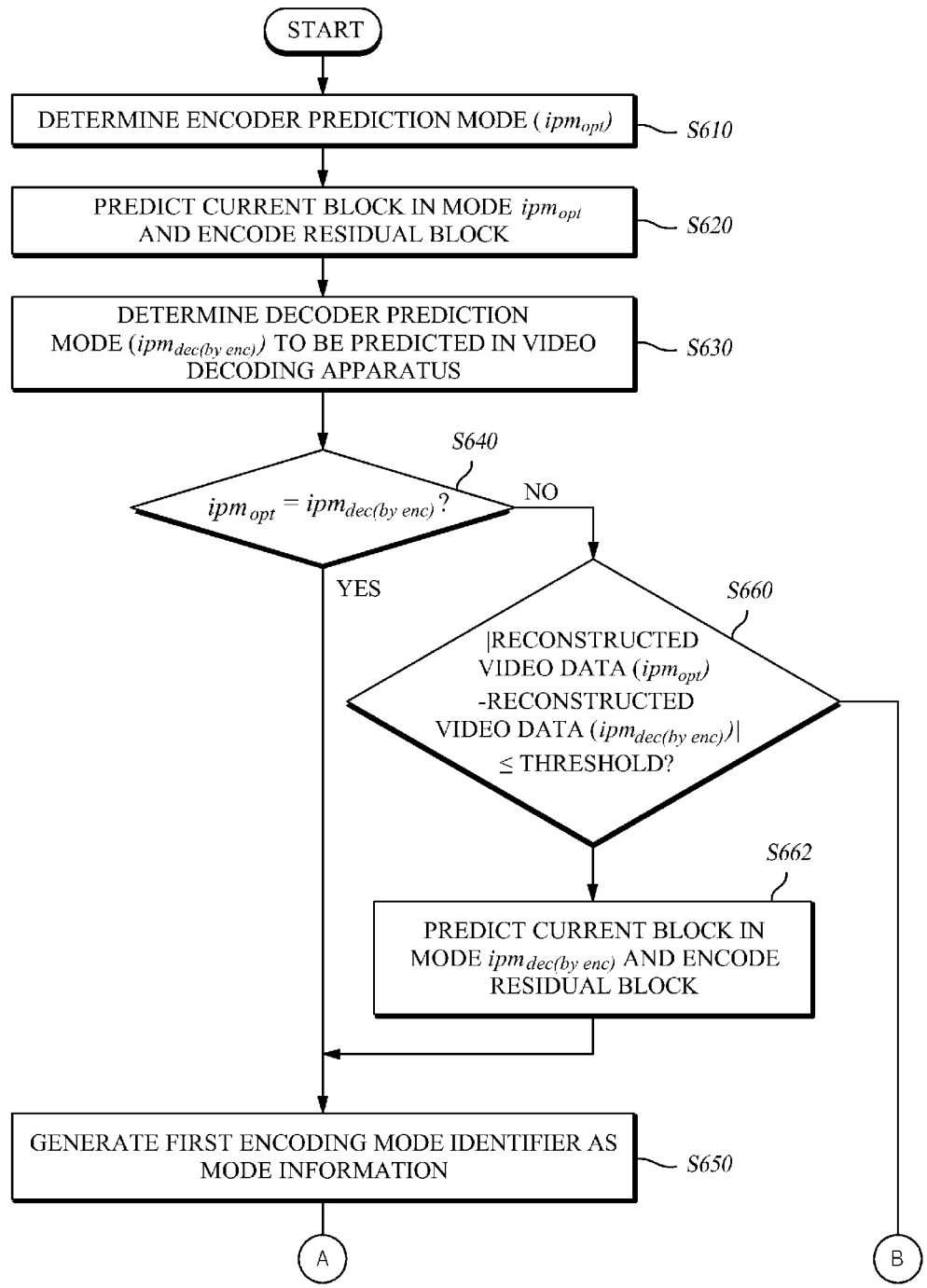
Figure 7:
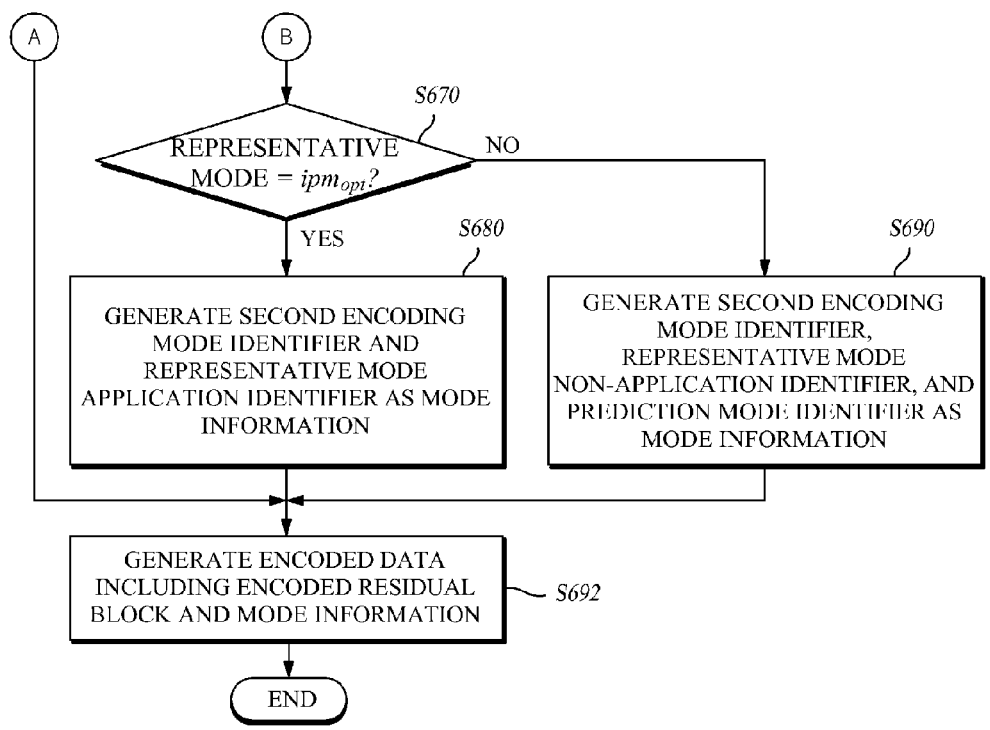

Referring to FIGS. 6 and 7, the video encoding method illustrated in FIGS. 4 and 5 may be more specified as shown. Steps S610 to S650 and steps S607 to S692 are respectively identical or similar to steps S410 to S450 and steps S460 to S490 described referring to FIGS. 4 and 5. However, in FIGS. 6 and 7, if step S640 decides the encoder prediction mode and decoder prediction mode are not identical as $ipm_{opt} \neq ipm_{dec(by\ enc)}$, rather than checking the equality of the current block representative mode to the encoder prediction mode, decision is made at step S660 on whether the difference between reconstructed video data in the encoder prediction mode and reconstructed video data in the decoder prediction mode through calculating and comparing the data, which difference may be expressed, for example, by |reconstructed video data by $ipm_{opt}$—reconstructed video data by $ipm_{dec(by\ enc)}$|, is less than or equal to a threshold.

If step S660 determines such difference is less than or equal to the threshold, video encoding apparatus 300 encodes a residual block generated by subtracting the current block with the predicted block, which is generated by predicting the current block in the decoder prediction mode $ipm_{dec(by\ enc)}$ at step S662, proceeds to step S650 and generates a first encoding mode identifier as the mode information, and if the difference exceeds the threshold at last, checks the equality of the current block representative mode to the encoder prediction mode at step S670, and depending on the decision, generates either a second encoding mode identifier and a representative mode application identifier as the mode information at step S680 or all of the second encoding mode identifier, a representative mode non-application identifier, and a prediction mode identifier as the mode information at step S690.

Video encoding apparatus 300 generates encoded data including the residual block and the mode information at step S692, and if there have been made the prediction of the current block in the decoder prediction mode and the encoding of the residual block at step S662, it generates the encoded data including the mode information (i.e., the first encoding mode identifier) and not the residual block encoded at step S620 but the residual block encoded at step S662.

Referring to FIGS. 8 to 11, a video encoding method according to an aspect may be implemented as shown. Firstly in FIGS. 8 and 9, video encoding apparatus 300 having determined an encoder prediction mode and encoded a residual block at steps S810 and S820, checks the equality of the encoder prediction mode $ipm_{opt}$ to the current block at step S830. Here, the steps S810 and S820 are identical or similar to steps S410 and S420 and the detailed descriptions are omitted.

When step S830 determines that the encoder prediction mode is identical to the current block representative mode as $ipm_{opt}$=representative mode, video encoding apparatus 300 generates an A encoding mode identifier for representing the identity of the encoder prediction mode and the current block representative mode as the mode information at step S840. Here, the A encoding mode identifier may be implemented by, for example, a 1-bit flag valued '1'. In addition, when step S830 determines that the encoder prediction mode is not identical to the current block representative mode as $ipm_{opt} \neq$representative mode, video encoding apparatus 300 determines a decoder prediction mode or an intra-prediction mode to be predicted by a decoding apparatus at step S850, and compares the encoder prediction mode $ipm_{opt}$ and the decoder prediction mode $ipm_{dec(by\ enc)}$ to check their identity at step S860.

When step S860 determines that the encoder prediction mode is identical to the decoder prediction mode as $ipm_{opt}=ipm_{dec(by\ enc)}$, video encoding apparatus 300 generates as the mode information a B encoding mode identifier for representing the identity of the encoder prediction mode to not the current block representative mode but the decoder prediction mode (that is the predictability of the encoder prediction mode by the video decoding apparatus) at step S870. Here, the B encoding mode identifier may be represented by, for example, a 2-bit flag valued '01'.

In addition, when step S860 determines that the encoder prediction mode is not identical to the decoder prediction mode as $ipm_{opt}=ipm_{dec(by\ enc)}$, video encoding apparatus 300 generates a C encoding mode identifier as the mode information for representing the inequality of the encoder prediction mode to both the current block representative mode and the decoder prediction mode while identifying the encoder prediction mode at step S870. Here, the C encoding mode identifier may be represented by, for example, 2-bit flag valued '00' and N-bit (N is an integer) flag having a 'codeword' where the 2-bit flag represents the inequality of the encoder prediction mode to both the current block representative mode and the decoder prediction mode and the N-bit flag identifies an intra-prediction mode among candidate intra-prediction modes selectable by the video decoding apparatus or the rest candidate intra-prediction modes except the representative mode.

At step S820, video encoding apparatus 300 generates and outputs encoded data including the residual block encoded at steps S820 and the mode information generated in one of steps S850, S870, and S880.

Figure 8:
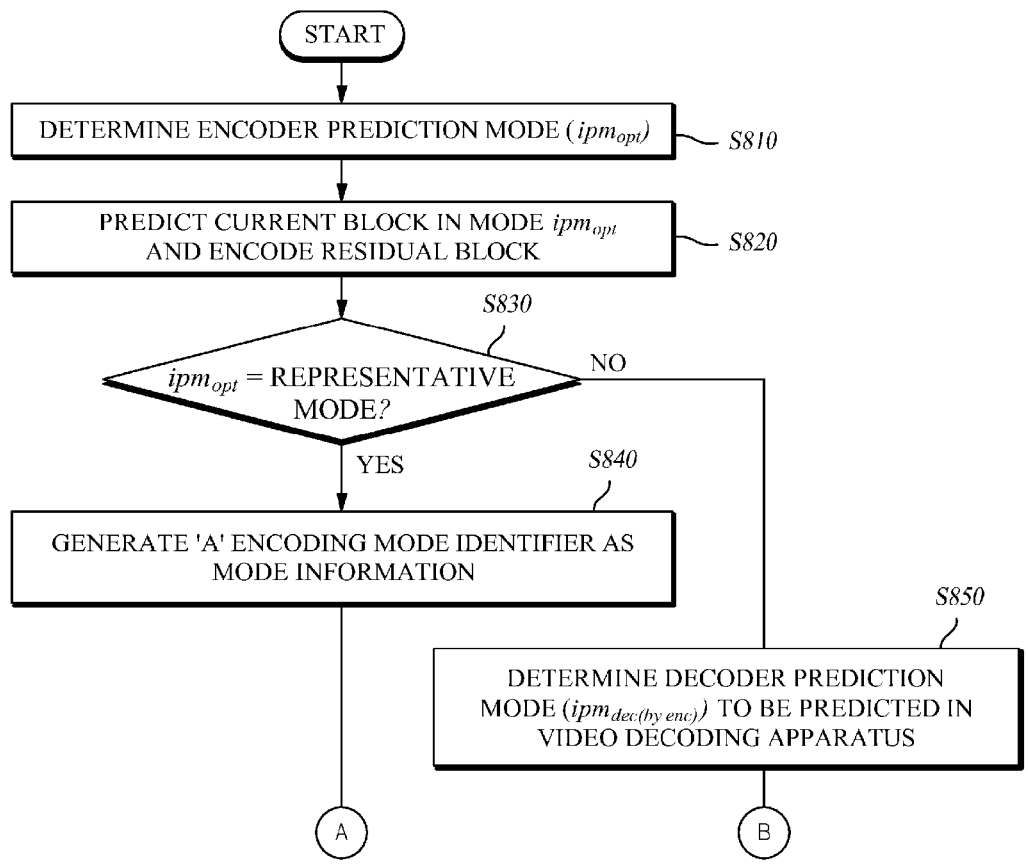
Figure 9:
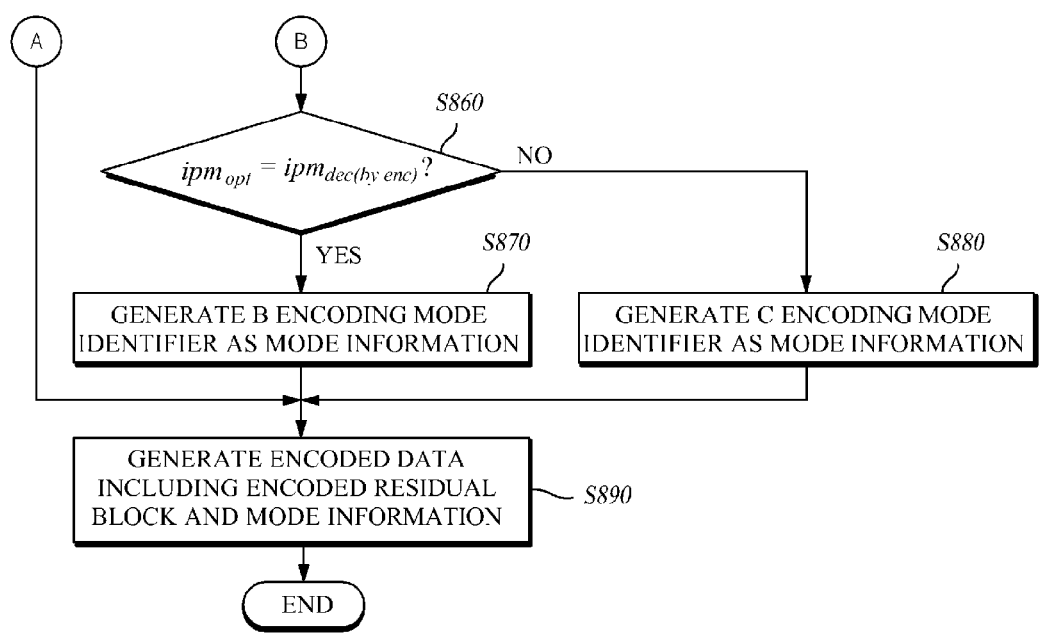
Figure 10:
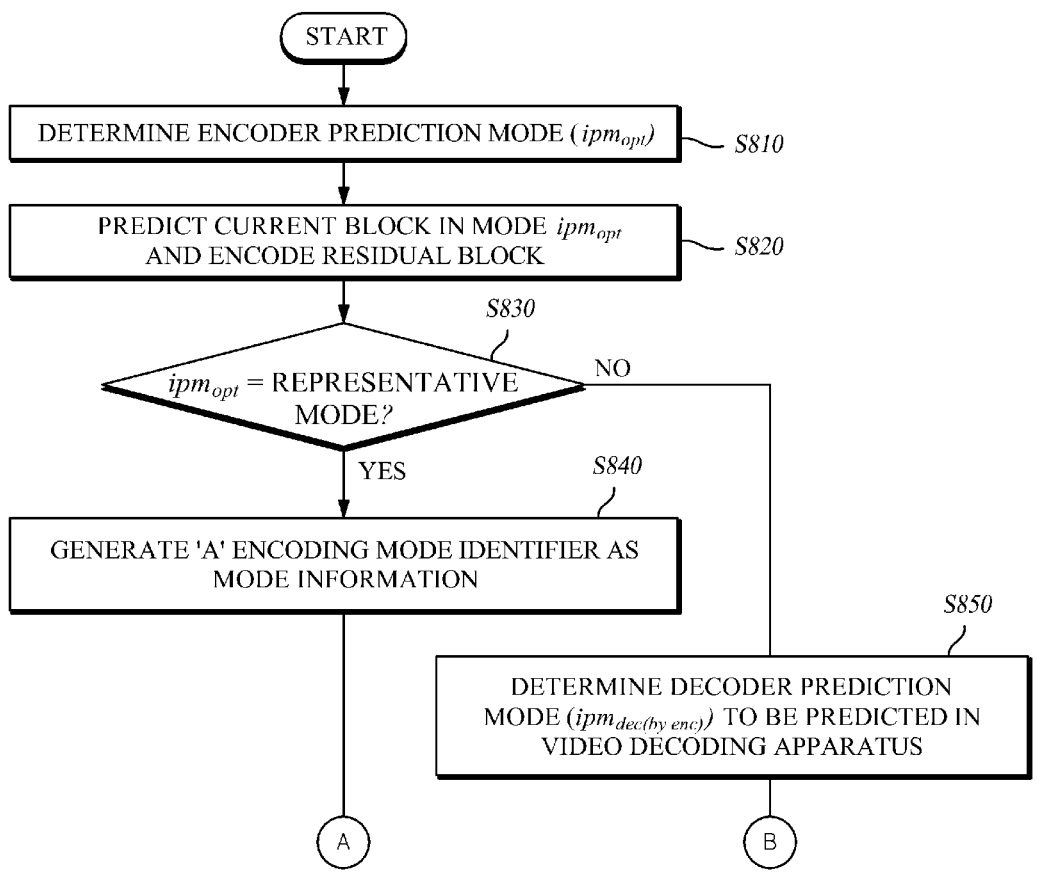
Figure 11:
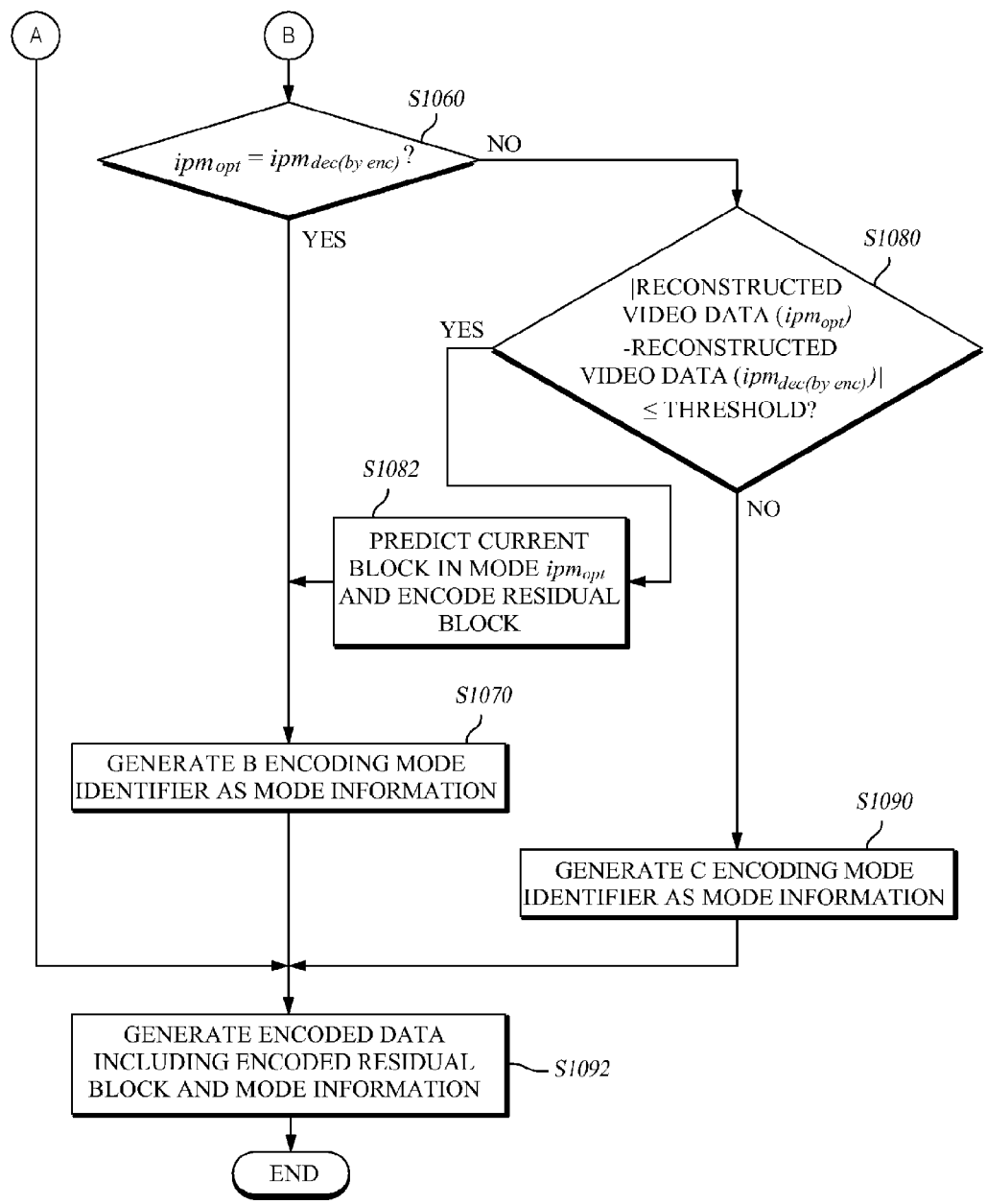

As FIGS. 6 and 7 specify FIGS. 4 and 5, the video encoding method illustrated in FIGS. 8 and 9 may be more specified as shown in FIGS. 10 and 11. Steps S1010 to S1070 and steps S1090 and S1092 are respectively identical or similar to steps S810 to S870 and steps S880 to S890 described referring to FIGS. 8 and 9.

However, in FIGS. 10 and 11, if step S1060 determines that the encoder prediction mode and decoder prediction mode are not identical as $ipm_{opt} \neq ipm_{dec(by\_enc)}$, rather than checking the equality of the current block representative mode to the encoder prediction mode, decision is made at step S1080 whether the difference between reconstructed video data in the encoder prediction mode and reconstructed video data in the decoder prediction mode through calculating and comparing the data is less than or equal to a threshold. The above difference may be expressed, for example, by |reconstructed video data by $ipm_{opt}$−reconstructed video data by $ipm_{dec(by\_enc)}$|. If step S1080 determines that such difference is less than or equal to the threshold, video encoding apparatus 300 encodes a residual block generated by subtracting the current block with the predicted block, which is generated by predicting the current block in the decoder prediction mode $ipm_{dec(by\_enc)}$ at step S1082, proceeds to step S1070 and generates a B encoding mode identifier as the mode information, and if the difference exceeds the threshold at last, it generates a C encoding mode identifier as the mode information at step S1090.

Video encoding apparatus 300 generates encoded data including the encoded residual block and the mode information at step S1092, and if there has been made the prediction of the current block in the decoder prediction mode and the encoding of the residual block has been made at step S1082, it generates the encoded data including the mode information (i.e., the first encoding mode identifier) and the encoded residual block at step S1082 instead of the residual block encoded at step S1020.

Different from the descriptions with reference to FIGS. 4 to 7, in FIGS. 8 to 11, video encoding apparatus 300 is made to check the identity of the encoder prediction mode to the current block representative mode, whereby once selecting the first encoding mode, the video encoding apparatus 300 is saved from calculating the encoder prediction mode to be predicted by the video decoding apparatus, resulting in a reduction of calculating operations which enables a simplified implementation of video encoding apparatus 300.

As described above, the video in the form of encoded data processed by video encoding apparatus 300 may then be transmitted in real time or non-real-time to video decoding apparatuses described below for decoding the same before its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 12:
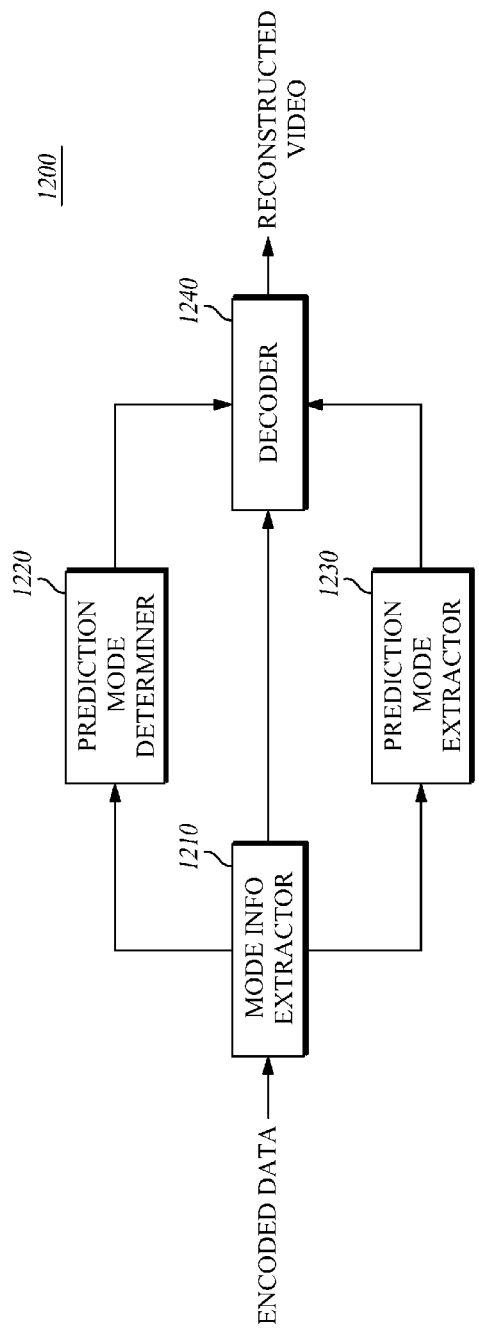
FIG. 12 is a block diagram of a video decoding apparatus according to an aspect.

FIG. 12 is a block diagram of a video decoding apparatus according to an aspect.

Video decoding apparatus 1200 according to an aspect may comprise a mode info extractor 1210, prediction mode determiner 1220, a prediction mode extractor 1230, and a decoder 1240. Video encoding apparatus 1200 may be a personal computer or PC, notebook or laptop computer, personal digital assistant or PDA, portable multimedia player or PMP, PlayStation Portable or PSP, or mobile communication terminal or such devices, and may represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Mode info extractor 1210 extracts mode information from encoded data. In addition, mode info extractor 1210 analyzes the mode information extracted from the encoded data, delivers the same to prediction mode determiner 1220 if the mode information is confirmed to include a first encoding mode identifier, delivers the same to prediction mode extractor 1230 if the mode information includes a second encoding mode identifier, and delivers the encoded data after the extraction of the mode information to encoder 1240.

Although mode info extractor 1210 is described herein as it delivers the mode information to prediction mode determiner 1220 or prediction mode extractor 1230, it is possible to omit the delivery of the mode information and to analyze it and accordingly activate prediction mode determiner 1220 or prediction mode extractor 1230. For example, if the mode information includes the first encoding mode identifier, mode info extractor 1210 may activate prediction mode determiner 1220, which in turn selects a current block intra-prediction mode among candidate intra-prediction modes. In addition, if the mode information includes the second encoding mode identifier, mode info extractor 1210 may activate prediction mode extractor 1230, which in turn extracts information such as a representative mode identifier identifying the prediction mode, representative mode non-application identifier, prediction mode identifier and the like.

Prediction mode determiner 1220 determines the current block intra-prediction mode of a video if the mode information includes the first encoding mode identifier that represents the identity of the encoder prediction mode to the decoder prediction mode. Specifically, upon receiving the first encoding mode identifier delivered or being activated by mode info extractor 1210, prediction mode determiner 1220 checks the identity of the encoder prediction mode to the decoder prediction mode to determine the current block intra-prediction mode. Prediction mode determiner 1220 determines the current block intra-prediction mode in a manner similar or identical to the mode info generator of video encoding apparatus 300 determining the decoder prediction mode as described above by way of Equation 2.

In other words, prediction mode determiner 1220 automatically determines the current block intra-prediction mode if the mode information includes the first encoding mode identifier representing the identity of the encoder prediction mode to the decoder prediction mode. Namely, prediction mode determiner 1220 may calculate decision functions according to the respective candidate intra-prediction modes selectable, select from the selectable candidate intra-prediction modes an intra-prediction mode having a minimum value of the decision function, and determines the latter intra-prediction mode as the intra-prediction mode of the current block. Here, the decision function is a function for calculating the degree of difference between boundary pixels located in the current block at boundaries and adjacent pixels in neighboring blocks immediately adjacent to the boundary pixels in accordance with a boundary pixel matching.

In addition, prediction mode determiner 1220 may select an intra-prediction mode as the decoder prediction mode $ipm_{dec}$ among the candidate intra-prediction modes selectable from collated candidate set CS' by using Equation 3.

$$ipm_{dec} = \operatorname*{argmin}_{ipmc \subset CS'} h(ipmc) \qquad \text{Equation 3}$$

$$h(ipmc) = \sum_{j \in BMS} [Neigh(j) - \{Cur_{pred}(ipmc, j) + Cur_{residue}(j)\}]^2$$

In Equation 3, boundary matching set (BMS) represents a set of indices for indicating the locations of the pixels in the current block at boundaries of neighboring blocks. $Cur_{pred}$ (ipmc, j) stands for the predicted pixels in the predicted block generated from predicting the current block in the respective candidate intra-prediction modes ipmc selectable by the video decoding apparatus, and $Cur_{residue}$(j) indicates a reconstructed residual block through a decoding operation on the encoded data from which the mode information was extracted. Neigh(j) represents the previously reconstructed neighboring block pixels.

To this end, prediction mode determiner 1220 calculates the decision function of h( ) in Equation 3 with respect to the candidate intra-prediction modes ipmc selectable among the candidate set CS' collated, and selects from the candidate intra-prediction modes an intra-prediction mode having a minimum value of the decision function of h( ) as the decoder prediction mode $ipm_{dec}$. The candidate set CS' selectable by video decoding apparatus 1200 may be the same as the candidate set CS selectable by video encoding apparatus 300, although they may be different if video decoding apparatus 800 fails to form predictions from side information in some intra-prediction modes of the candidate set CS because those intra-prediction modes are excluded and the remaining intra-prediction modes are used.

Herein, the decision function of h( ) may be a function for calculating in a boundary matching algorithm (BMA) the difference between boundary pixels in the current block at the boundary against the neighboring blocks and the adjacent pixels in the immediately neighboring blocks. The decision function of h( ) is same as described with respect to the decision function of g( ) by way of Equation 2.

Therefore, prediction mode determiner 1220 receives reconstructed residual pixels $Cur_{residue}$(j) in a reconstructed residual block through a decoding operation on the encoded data from decoder 1240, and predicts the current block according to an arbitrary intra-prediction mode among the candidate intra-prediction modes selectable from the collated candidate set (CS') to obtain predicted pixels $Cur_{pred}$ (ipmc, in the predicted block and adds the reconstructed residual pixel $Cur_{residue}$(j) thereto, subsequently subtracting adjacent pixels Neigh(j) in the previously reconstructed neighboring block followed by raising the result, carrying out this calculation for all of the pixels at the boundary pixel locations to get their sum and the resultant h(ipmc). This process is repeated for each of the candidate intra-prediction modes and a determination is made on the intra-prediction mode having the lowest value, whereby the decoder prediction mode $ipm_{dec}$ is determined.

In case the mode information includes the second encoding mode identifier indicative of the inequality of the encoder and decoder prediction modes, and information identifying the prediction mode for identifying the encoder prediction mode, prediction mode extractor 1230 determines the intra-prediction mode that is identified by information identifying the prediction mode as the current block intra-prediction mode. In other words, upon receipt of the second encoding mode identifier indicative of the inequality of the encoder and decoder prediction modes and information identifying the prediction mode, prediction mode extractor 1230 recognizes the inequality of the modes and determines the intra-prediction mode that is identified by information identifying the prediction mode as the current block intra-prediction mode.

Here, information identifying the prediction mode may include the representative mode application identifier or the representative mode non-application identifier. In case it includes the representative mode application identifier, prediction mode extractor 1230 may obtain the representative mode and determine it to be the current block intra-prediction mode. In addition, if the inequality of the encoder prediction mode to the representative mode is identified by the representative mode non-application identifier in information identifying the prediction mode, it is determined that the intra-prediction mode identified by the prediction mode identifier included in information identifying the prediction mode as being the current block intra-prediction mode. The representative mode of the current block may be the current block's most probable mode, which may be determined in accordance with the mode number of the intra-prediction modes of the neighboring blocks as described referring to FIG. 2.

Decoder 1240 decodes an encoded residual block extracted from the encoded data and adds the decoded residual block to a predicted block generated from predicting the current block in the current block intra-prediction mode determined by prediction mode extractor 1230 in order to reconstruct the current block.

In the above, the construction of the decoding apparatus for the encoded data were described through FIG. 12 where the mode information included the first and the second encoding mode identifiers and information identifying the prediction mode, while an aspect of video decoding apparatus may also have an alternative construction as will be described.

Though not shown, the alternative video decoding apparatus may comprise a mode information extractor, a prediction mode determiner, and decoder. In comparison with the video decoding apparatus 1200 comprising prediction mode determiner 1220 and prediction mode extractor 1230, this alternative video decoding apparatus may consist of only the prediction mode determiner (not shown). Here, the mode information extractor and decoder (both not shown) are equal or similar to mode information extractor 1210 and decoder 1240.

However, the prediction mode determiner (not shown) determines the representative mode as the current block intra-prediction mode in the case where the mode information includes an A encoding mode identifier that represents the identity of the encoder prediction mode to the representative mode of the current block. In addition, this prediction mode determiner selects the current block intra-prediction mode among the candidate intra-prediction modes if the mode information includes a B encoding mode identifier representing that the encoder prediction mode is not identical to the representative mode but to the decoder prediction mode. In addition, if the mode information includes a C encoding mode identifier representing that the encoder prediction mode is identical neither to the representative mode nor to the decoder prediction mode, the same prediction mode determiner selects the intra-prediction mode which is identified by the C encoding mode identifier as the current block intra-prediction mode.

That is, the video decoding apparatus in this aspect may be implemented in a simple configuration because when the mode information includes the A encoding mode identifier it needs not determine the current block intra-prediction mode among the candidate intra-prediction modes, obviating the complex procedure involving heavy calculations.

Figure 13:
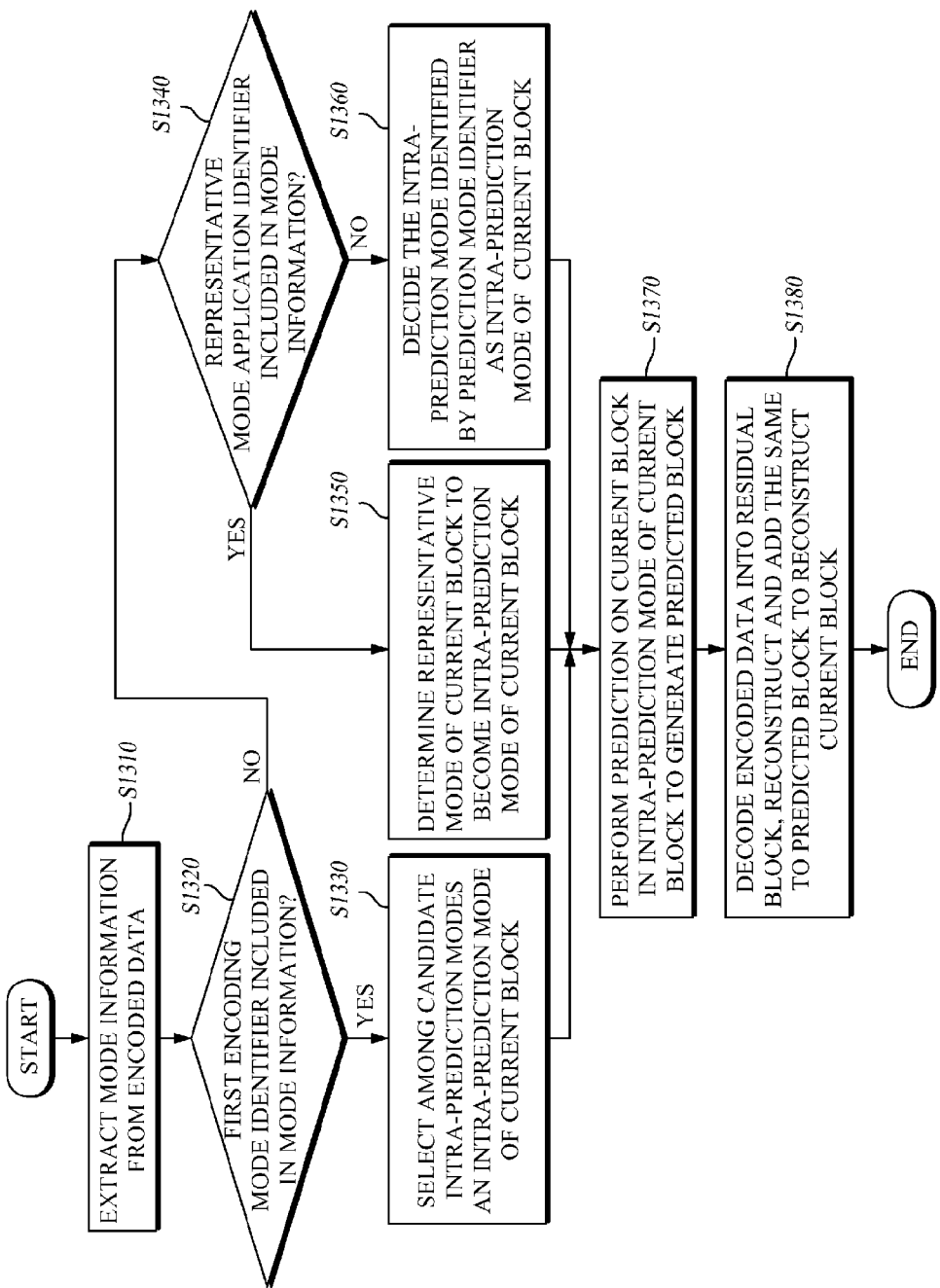
FIGS. 13 and 14 are flow diagrams for illustrating a video encoding method according to an aspect.
Figure 14:
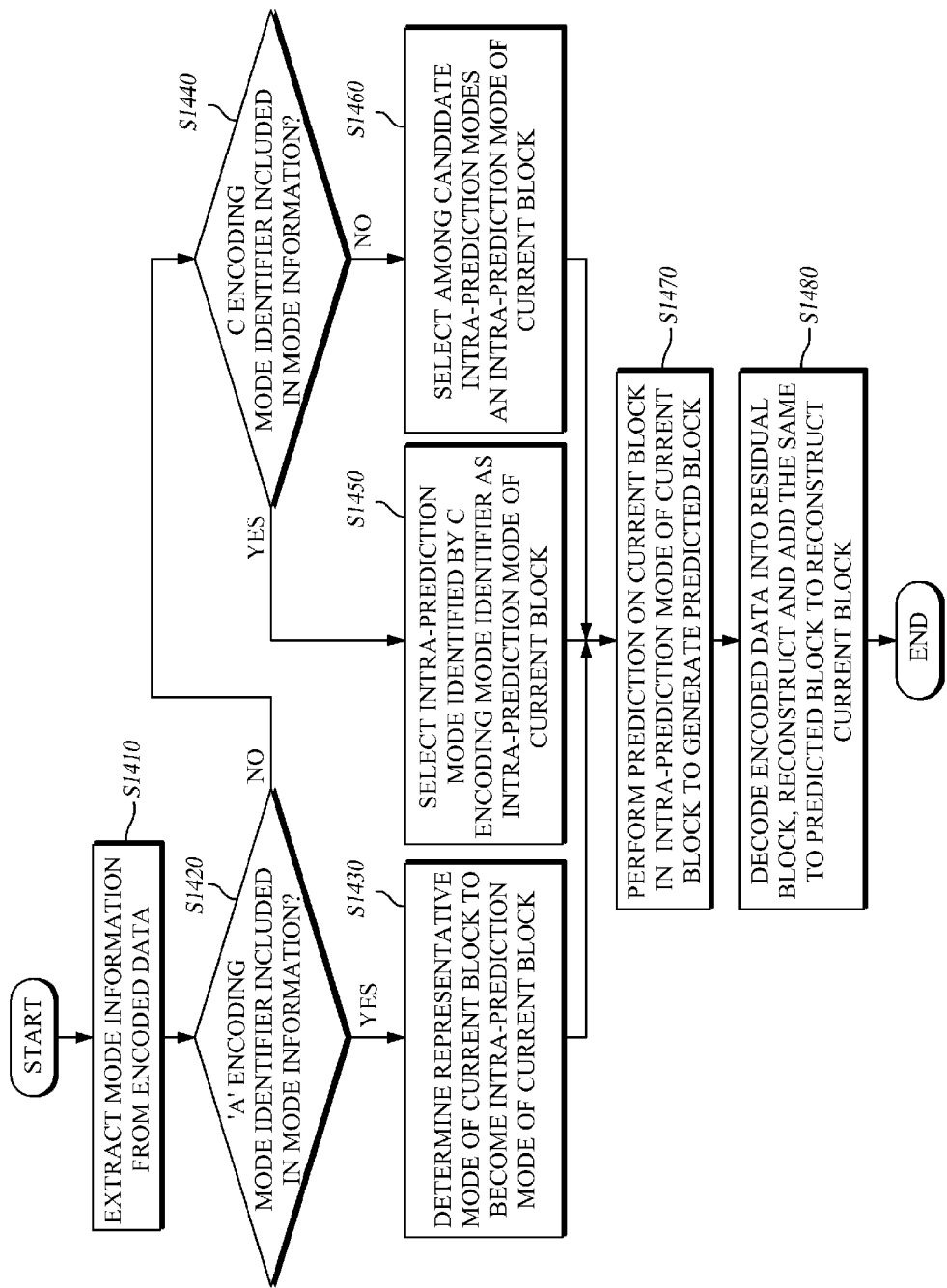

FIGS. 13 and 14 are flow diagrams for illustrating a video decoding method according to an aspect.

Upon receiving encoded data for the video via a wired/wireless communication network or cable, video decoding apparatus 1200 stores the same before reproducing the video through decoding and reconstructing following an algorithm of the user's choice of a program or another program in execution.

Referring to FIG. 13, video decoding apparatus 1200 extracts mode information from the encoded data at step S1310, checks if the mode information includes a first encoding mode identifier at step S1320, and if it does indicating the identity of an encoder prediction mode to a decoder prediction mode, then determines an intra-prediction mode of the video's current block at step S1330.

When video decoding apparatus 1200 comes to a negative decision that the mode information includes not the first encoding mode identifier for representing the identity of the encoder prediction mode to the decoder prediction mode at step S1320 but a second encoding mode identifier for representing their inequality, the apparatus 1200 decides the intra-prediction mode identified by information identifying the prediction mode as the current block intra-prediction mode through checking if the mode information includes a representative mode application identifier at step S1340, and if it does, determining the representative mode of the current block to become the intra-prediction mode of the current block at step S1350. If the mode information includes not the representative mode application identifier but a representative mode non-application identifier, it decides the intra-prediction mode identified by a prediction mode identifier as the current block intra-prediction mode at step S1360.

Upon determining the current block intra-prediction mode, video decoding apparatus 1200 decodes an encoded residual block extracted from the encoded data, and forms prediction on the current block in the current block intra-prediction mode decided in one of the steps S1330, S1350, and S1360 to generate a predicted block at step S1370 and add the same to the decoded residual block to eventually reconstruct the current block at step S1380.

Referring to FIG. 14, a video decoding method according to an aspect may be implemented as illustrated therein.

At step S1410, a video decoding apparatus (not shown) extracts mode information from encoded data, decides if the mode information includes an A encoding mode identifier at step S1420, and if it does representing the identity of the encoder prediction mode to the representative mode of the current block, then determines this representative mode as the current block intra-prediction mode in step S1430.

When this video decoding apparatus makes a decision at step S1420 that the mode information does not include the A encoding mode identifier that represents the identity of the encoder prediction mode to the representative mode of the current block, it checks whether the mode information includes a C encoding mode identifier representing that the encoder prediction mode is identical to neither the representative mode nor the decoder prediction mode at step S1440, and if the inclusion of the C encoding mode identifier is determined, it selects the intra-prediction mode which is identified by the C encoding mode identifier as the current block intra-prediction mode at step S1450, but if the decision is non-inclusion of the C encoding mode identifier (B encoding mode identifier is included instead), it selects the current block intra-prediction mode among the candidate intra-prediction modes at steps S1460.

Upon deciding the current block intra-prediction mode, the video decoding apparatus decodes an encoded residual block extracted from the encoded data at step S1470, and performs prediction on the current block in the current block intra-prediction mode decided in one of the steps S1430, S1450, and S1460 to generate a predicted block and add the same to the decoded residual block to eventually reconstruct the current block at step S1480.

The video decoding methods described referring to FIGS. 13 and 14 may be generalized and implemented as in the description below. Specifically, the video decoding methods may extract, from the encoded data, the mode information that indicates whether there is a predictability of the intra-prediction mode of the current block by the video decoding apparatus, determine the current block intra-prediction mode according to the mode information, generate a predicted version of the current block in the determined intra-prediction mode, decode a current block's encoded residual block extracted from the encoded data into a reconstruction, and add this residual block reconstruction to the predicted block to eventually reconstruct the current block.

In this case, when determining the current block intra-prediction mode, if the mode information represents that the video decoding apparatus has the predictability of the current block intra-prediction mode, it is possible to collate candidate intra-prediction modes, and select one intra-prediction mode among the candidates as the current block intra-prediction mode. However, if the mode information represents that the video decoding apparatus is unable to predict the current block intra-prediction mode, it is possible to determine, as the current block intra-prediction mode, an intra-prediction mode that is identified by information identifying the prediction mode, the information being extracted from the encoded data.

Here, the mode information may indicate whether the video decoding apparatus can predict an intra-prediction mode among the candidate intra-prediction modes to be the current block intra-prediction mode.

FIG. 15 is an exemplary diagram showing a process of calculating a decision function according to an aspect.

A prediction is formed with respect to the current block in each of candidate intra-prediction modes ipmc to obtain predicted block's predicted pixels $Cur_{pred}(ipmc, j)$ and another prediction is formed with respect to the current block in an encoder prediction mode $ipm_{opt}$ to obtain one or more reconstructed residual pixels $Cur_{residue}(j)$ of a reconstructed residual block from first encoding and then decoding a residual block and these pixels are summed to calculate $Cur_{pred}(ipmc, j)+Cur_{residue}(j)$, subsequently subtracting adjacent pixels Neigh(j) in the previously reconstructed neighboring block before raising the result, and carrying out this calculation for all of the pixels at the boundary pixel locations to get their sum and thus the resultant g(ipmc).

For example, if the nine prediction modes of the intra_4×4 prediction in H.264/AVC standard can be collated as candidate intra-prediction modes, nine predicted pixels $Cur_{pred}$ (ipmc, j) will be generated along with one reconstructed residual pixel $Cur_{residue}(j)$. Therefore, each of the nine predicted pixels $Cur_{pred}(ipmc, j)$ is added to the reconstructed residual pixel $Cur_{residue}(j)$, generating nine of $Cur_{pred}(ipmc, j)+Cur_{residue}(D)$, subsequently subtracting the adjacent pixels Neigh(j) in the previously reconstructed neighboring block before raising the result, and repeating this operation for all of the pixels at the boundary pixel locations to sum their calculations.

FIGS. 16 and 17 are exemplary diagrams showing mode information generated according to as aspect.

FIG. 16 exemplifies mode information for which a first encoding mode identifier or a second encoding mode identifier is generated from an initial decision on the equality of an encoder prediction mode to a decoder prediction mode. Whereas, FIG. 17 exemplifies mode information for which an A encoding mode identifier or a C encoding mode identifier is generated from an initial decision on the equality of the encoder prediction mode to a current block representative mode.

According to the present disclosure as illustrated, depending on whether the encoder prediction mode is predictable by a video encoding apparatus, the mode information may become diverse, whereby preventing a degradation of the video quality and providing a great compression performance. In addition, by generating the mode information using the method illustrated in FIG. 17, not only can the encoding operation become more efficient but also the amount of calculations in the video encoding and decoding apparatuses may be substantially reduced enabling simplifications of the respective apparatuses.

Meanwhile, in an aspect described above, the step of determining whether |reconstructed video data by $ipm_{opt}$–reconstructed video data by $ipm_{dec(by\ enc)}$| is less than or equal to a threshold is merely an exemplifying illustration to decide whether there is a great difference between the data $ipm_{opt}$ and $ipm_{dec(by\ enc)}$ and it is not imperative to compare the |reconstructed video data by $ipm_{opt}$—reconstructed video data by $ipm_{dec(by\ enc)}$| with the threshold to reach the same decision but other various criteria may be followed to figure out a meaningful difference between the reconstructed video data by $ipm_{opt}$ and the reconstructed video data by $ipm_{dec(by\ enc)}$. For example, the necessitated bit rate and distortion in encoding a residual signal from the reconstructed video data by $ipm_{opt}$ may be compared with the necessary bit rate and distortion in encoding the residual signal from the reconstructed video data by $ipm_{dec(by\ enc)}$ to decide which one of available prediction modes $ipm_{opt}$ and $ipm_{dec(by\ enc)}$ is preferable in terms of rate-distortion, whereby a decision may be made on whether a meaningful difference is present between the reconstructed video data by $ipm_{opt}$ and the reconstructed video data by $ipm_{dec(by\ enc)}$.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in a video encoding/decoding apparatus and method using intra-prediction to predict the video with a minimum necessary bit rate to encode information on the intra-prediction mode to enhance the video compression performance.

The invention claimed is:

1. A method for decoding a video comprising:
   extracting mode information for predicting a current block from encoded data;
   deriving a set of candidate intra-prediction modes including at least three candidate intra-prediction modes, depending on the current block;
   determining a candidate intra-prediction mode selected from the derived set of candidate intra-prediction modes as the intra-prediction mode of the current block without comparing mode numbers of candidate intra-prediction modes included in the derived set each other, when the mode information indicates a first encoding mode;
   determining the intra-prediction mode of the current block by using a prediction mode identification information, when the mode information indicates a second encoding mode and includes the prediction mode identification information;
   generating a prediction block by predicting the current block based on the determined intra-prediction mode of the current block, and decoding the encoded data to produce a residual block; and
   reconstructing the current block by adding the residual block to the prediction block.

2. The method of claim 1, when the mode information indicates the second encoding mode and includes the prediction mode identification information including a representative mode identifier,
   wherein determining the intra-prediction mode of the current block by using the prediction mode identification information further comprises:
     setting the intra-prediction mode of the current block to the intra-prediction mode having a smaller mode number among the mode numbers of the intra-prediction modes of the left and upper blocks of the current block, when the representative mode identifier indicates a first value; and
     setting the intra-prediction mode of the current block by using a prediction mode identifier included in the prediction mode identification information, when the representative mode identifier indicates a second value.

3. The method of claim 1, wherein the derived set of candidate intra-prediction modes include an intra-prediction mode of at least one neighboring block adjacent to the current block.

4. The method of claim 1, wherein the derived set of candidate intra-prediction modes are derived by excluding one or more non-available intra-prediction modes according to information on neighboring blocks adjacent to the current block.

* * * * *